United States Patent [19]

Kobayashi et al.

[11] Patent Number: 4,661,950
[45] Date of Patent: Apr. 28, 1987

[54] INFORMATION TRANSMISSION SYSTEM IN A LOCAL AREA NETWORK SUITABLE FOR COLLISION DETECTION

[75] Inventors: Hiroshi Kobayashi, Tokyo; Hideaki Haruyama, Yokohama; Tsuguhiro Hirose, Tokyo, all of Japan

[73] Assignee: Kabushiki Kaisha Toshiba, Kawasaki, Japan

[21] Appl. No.: 769,027

[22] Filed: Aug. 26, 1985

[30] Foreign Application Priority Data

Sep. 4, 1984 [JP] Japan .................................. 59-183873

[51] Int. Cl.$^4$ ............................ H04J 3/02; H04J 3/24
[52] U.S. Cl. ......................................... 370/85; 370/94; 370/86; 340/825.5; 340/825.52
[58] Field of Search ................... 370/85, 86, 94, 60; 340/825.05, 825.06, 825.07, 825.5, 825.51, 825.52

[56] References Cited

U.S. PATENT DOCUMENTS

| | | | |
|---|---|---|---|
| 4,384,363 | 5/1983 | Lipcon | 340/825.5 |
| 4,531,239 | 7/1985 | Usui | 370/85 |
| 4,539,677 | 9/1985 | Lo | 370/85 |
| 4,573,045 | 2/1986 | Galin | 370/85 |

Primary Examiner—Douglas W. Olms
Assistant Examiner—Wellington Chin
Attorney, Agent, or Firm—Oblon, Fisher, Spivak, McClelland & Maier

[57] ABSTRACT

An information transmission system in which a plurality of data terminal equipments (DTEs) are coupled with a communication medium through corresponding medium attachment units (MAUs). The DTE transmits and receives an information signal in a format having a preamble section including a predetermined bit pattern and a data section. The MAU modulates and demodulates the information signal. The MAU is arranged to replace part of the preamble with random data in order to quickly detect the collision of information signals from a plurality of DTEs on the communication medium.

14 Claims, 12 Drawing Figures

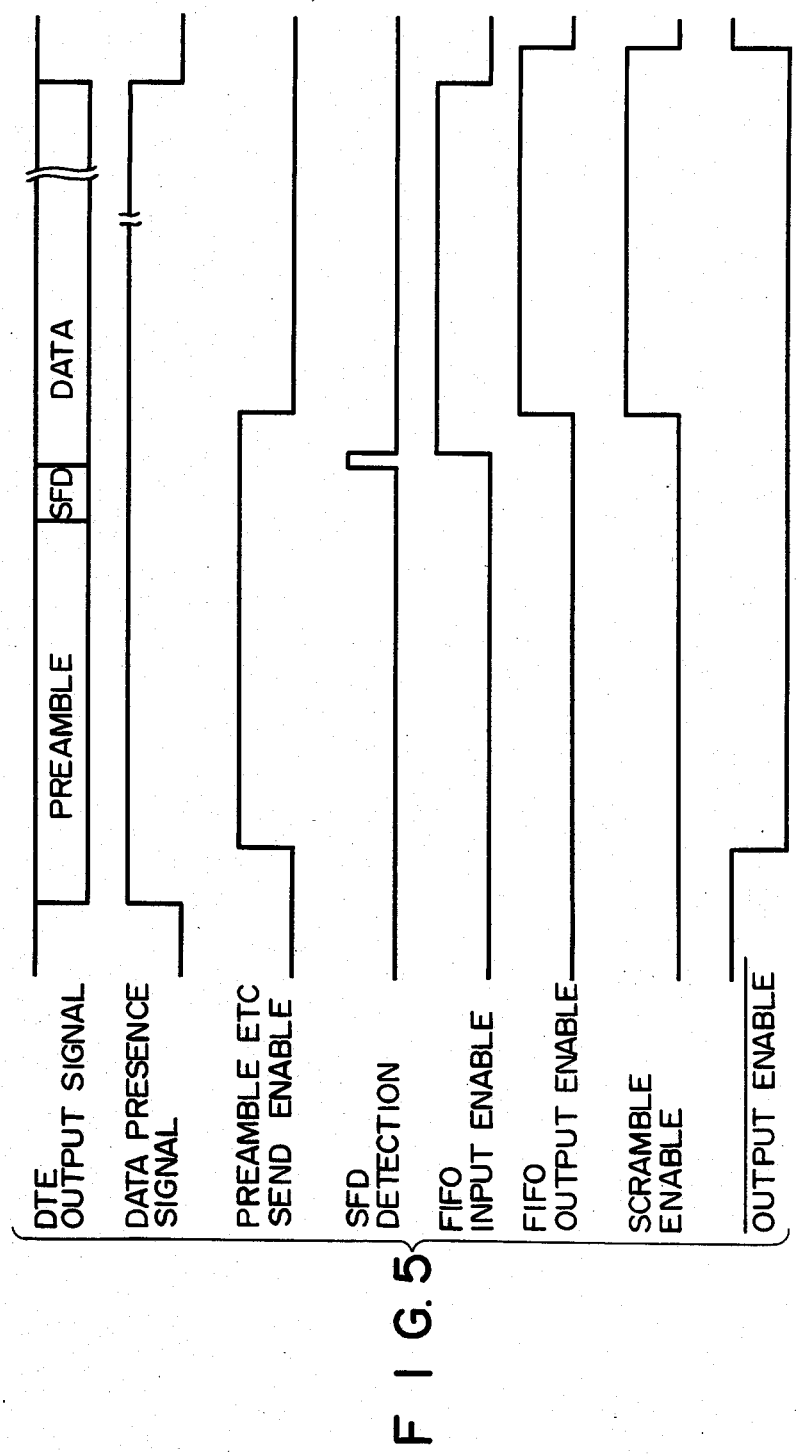
F I G. 5

F I G. 11
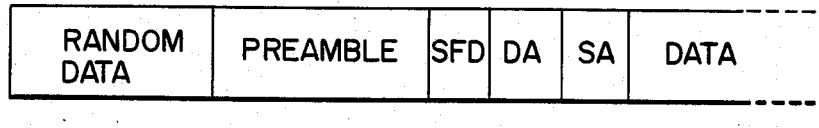
F I G. 12
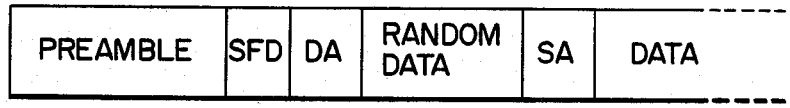

INFORMATION TRANSMISSION SYSTEM IN A LOCAL AREA NETWORK SUITABLE FOR COLLISION DETECTION

BACKGROUND OF THE INVENTION

This invention relates to an information transmission system.

In order to achieve, for example, a fully distributed peer protocol transmission system, i.e., a CSMA/CD (Carrier Sense Multiple Access/Collision Detection) system in a bus-configured broadband local area network (LAN), it is necessary to ensure the collision detecting characteristic of the same degree as the collision detecting characteristic in a baseband network and the compatibility with an upper layer protocol.

A short period of time is required for detecting a signal collision in the network. If a long period of time is taken for detecting the collision then the permissible network length will have to be short, deteriorating the extention capability of the network system.

According to the present IEEE standards, a data format for achieving the CSMA/CD of the baseband network has a 56-bit (7-octet) preamble, 8-bit SFD (Start Frame Delimiter), 48-bit DA (Destination Address), 48-bit SA (Source Address) and subsequent data of plural octets. In the baseband network the collision detection is carried out by detecting direct-current components on the network. With the broadband network, on the other hand, the collision is detected by either a bit comparison method or a beat-signal level detection method. In either case, a difference in bits between colliding data is used for the collision detection. To keep compatibility with the CASMA/CD in the baseband network the data format used in the broadband network must conform to the IEEE standards.

In a bus-shaped LAN, a plurality of data terminal equipments (DTEs) are each coupled through a corresponding medium attachment unit (MAU) to an arbitrary point on a communication medium to effect communication of information with each other. In such a LAN, particularly, the broadband LAN, when information signals are transmitted from a plurality of MAUs at a certain time interval, the detection of signal collision is expected to be effected on the basis of 1-bit or more data difference as quick as possible. However, it might occur that, in the worst case, bit streams consisting of the preamble, SFD, DA and SA transmitted from MAUs coincide with each other except the final 1 bit thereof. This occurs when the DAs are equal but the final bits of the SAs are different. Accordingly, in such a case, the collision of the information is detected after 160 bit times from the start of the transmission of the preamble. In other words, the collision detection requires a long period of time.

In a communication network, an information processor transmitting an information signal must be informed of the occurrence of collision during the transmission of information signal. As described above, due to the requirement of a long period of time for detecting a collision the length of the network must be shortened. Therefore, the extension capability of the network is limited, and the network becomes costly.

SUMMARY OF THE INVENTION

An object of this invention is to provide an improved information transmission system.

Another object of this invention is to provide an information transmission system capable of detecting a collision of information in a short period of time.

In an information transmission system of this invention, a plurality of information processors are each coupled to an arbitrary position on a communication medium and arranged to transmit and receive information in a data format having a preamble with a predetermined bit pattern and a subsequent data section significant to information transmission.

In order to achieve the above objects of the invention, each MAU is arranged to replace part of the preamble with random data prior to the transmission of an information signal to the communication medium.

BRIEF DESCRIPTION OF THE DRAWINGS

FIG. 5 is a time chart for describing the operation of the arrangement of FIG. 4;

FIGS. 11 and 12 show other examples of data format which may be used in this invention.

DETAILED DESCRIPTION OF THE PREFERRED EMBODIMENTS

Various methods can be utilized for detecting the collision of signals in a broadband network, and in the embodiment of the invention, a beat-signal level detection method is employed. This beat-signal detection method is disclosed in a copending U.S. patent application Ser. No. 563,248, entitled "DATA TRANSMISSION SYSTEM FOR A LOCAL NETWORK", filed Dec. 19, 1983 and assigned to the same assignee as the present application. According to this detection method the level of a reception signal is detected on the basis of the fact that, when a collision of frequency-modulated information signals occurs on a broadband network, a beat signal is produced whose envelope varies with time due to a difference in bit data of information signals. The envelope of beat signal varies from zero level to a level larger than an ordinary reception level of an information signal. Thus, the signal collision on the transmission line can be detected by detecting the level of the reception signal.

Figure 1:
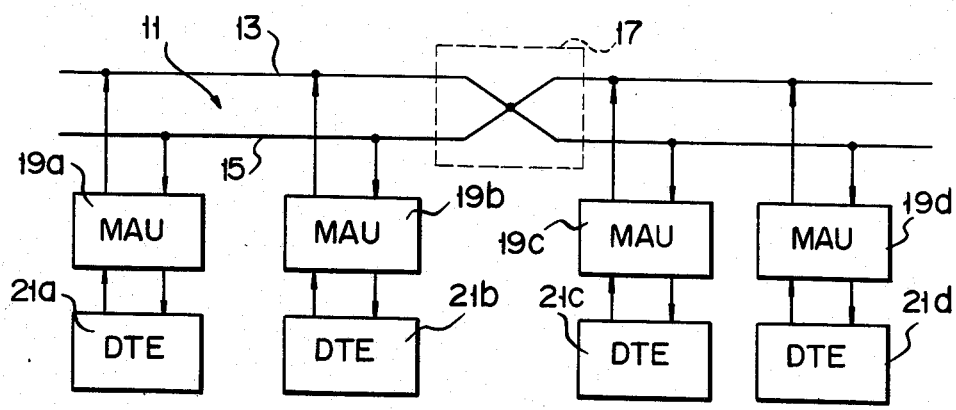
FIG. 1 shows a bus-configured local area network, to which this invention is applied.

A broadband network system, to which this invention can be applied, is schematically shown in FIG. 1. A communication medium 11 comprises a transmission line (up link) 13, a reception line (down link) 15, and a head end 17 having an amplifier and a directional coupler for coupling the up link and the down link. DTEs 21a, 21b, . . . , 21d are coupled through MAUs 19a, 19b, . . . , 19d to arbitrary points on medium 11. An information signal transmitted from each of the MAUs can be received by each MAU.

Figure 2:
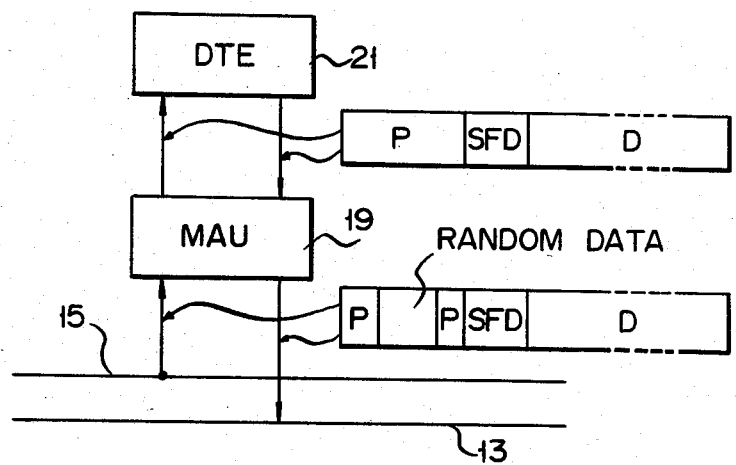
FIG. 2 is a diagram for describing data formats transmitted from a data terminal equipment (DTE) and a medium attachment unit (MAU)

As shown in FIG. 2, DTE 21 transmits to MAU 19 a Manchester-coded information signal in the data format having a preamble section, a SFD section and a data section to be transmitted as in the CSMA/CD baseband network system. The preamble section has a bit pattern of "101010 . . .", and the SFD has a bit pattern of "10101011". MAU 19 converts the Manchester-coded signal to a NRZ (Non-Return-to-Zero) signal, converts the format of the information signal from DTE 21 by replacing part of the preamble section with random data in accordance with this invention, and transmits the information signal in MSK (minimum shift keying) or FSK (frequency shift keying) modulation system over the broadband network.

Figure 3:
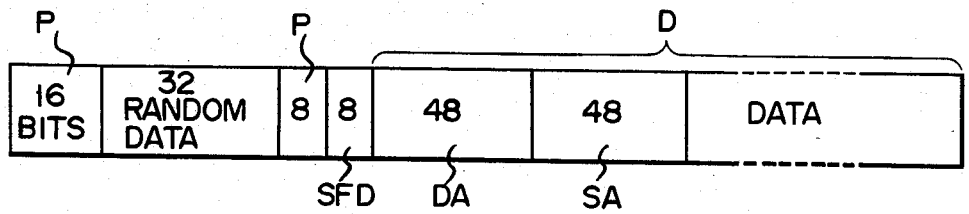
FIG. 3 shows a format of data transmitted from MAU in accordance with the invention.

The data format of the transmission information signal is shown in FIG. 3. 32-bit random data is inserted between the initial 16-bit preamble and the final 8-bit preamble. The data section has a 48-bit destination address (DA), a 48-bit source address (SA) and plural-octet data relating to significant information to be transmitted.

The random data is 32 bits and set at random each time an information signal is transmitted from the MAU. Accordingly, it is noted that, when the collision of the data occurs on the transmission line, a bit difference always occurs in the preamble. A beat signal is generated due to the bit difference so that the signal collision is detected. The collision of data can be also detected by comparing bits. The random data may be disposed ahead of the preamble, or disposed immediately before the SEF. In other words, the random data may be disposed at any position of the preamble. For the bit comparison method the random data should be disposed behind a preamble with a length required for clock synchronization of data.

Figure 4:
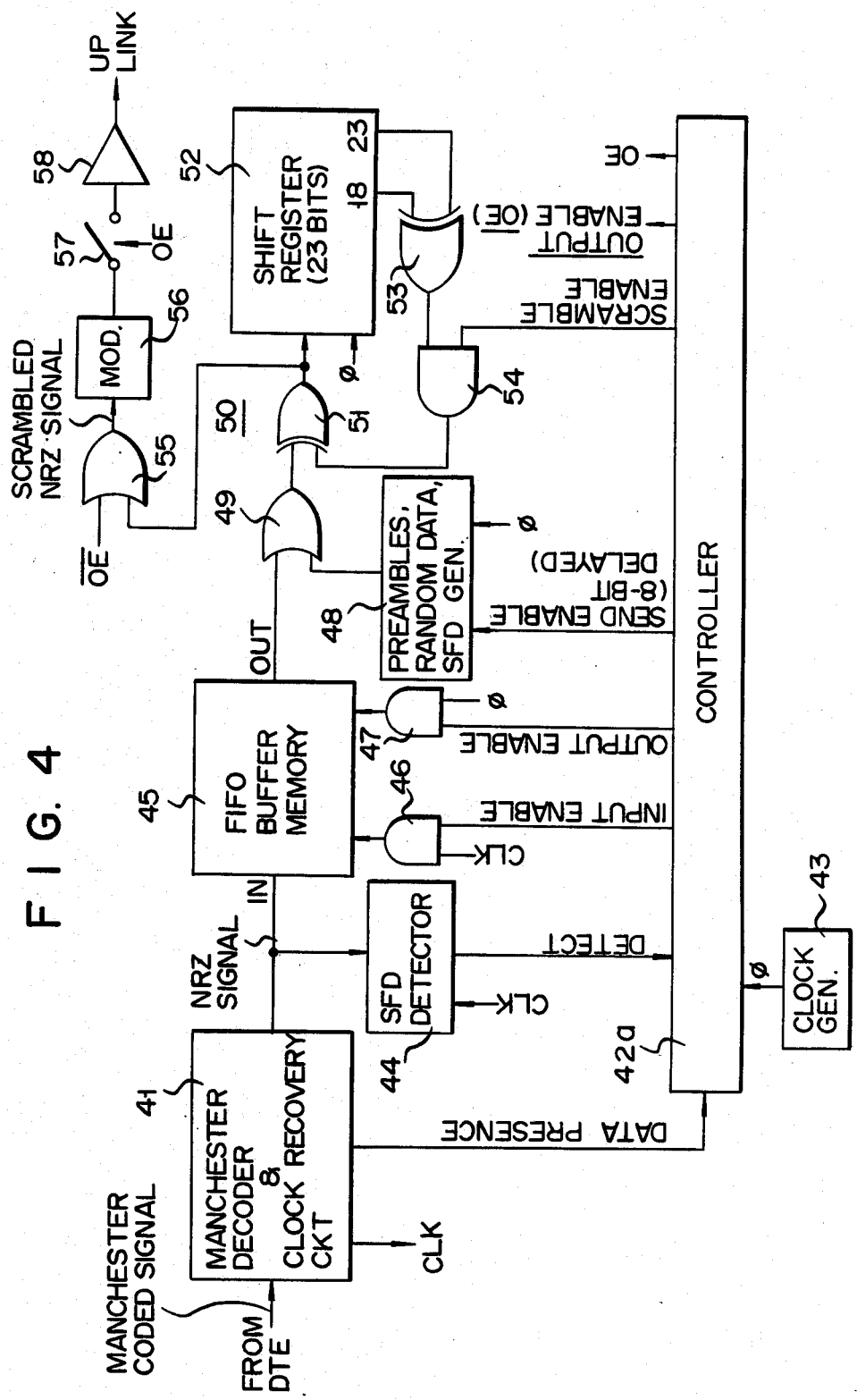
FIG. 4 is a block diagram of a transmission section of MAU embodying the invention.
Figure 6:
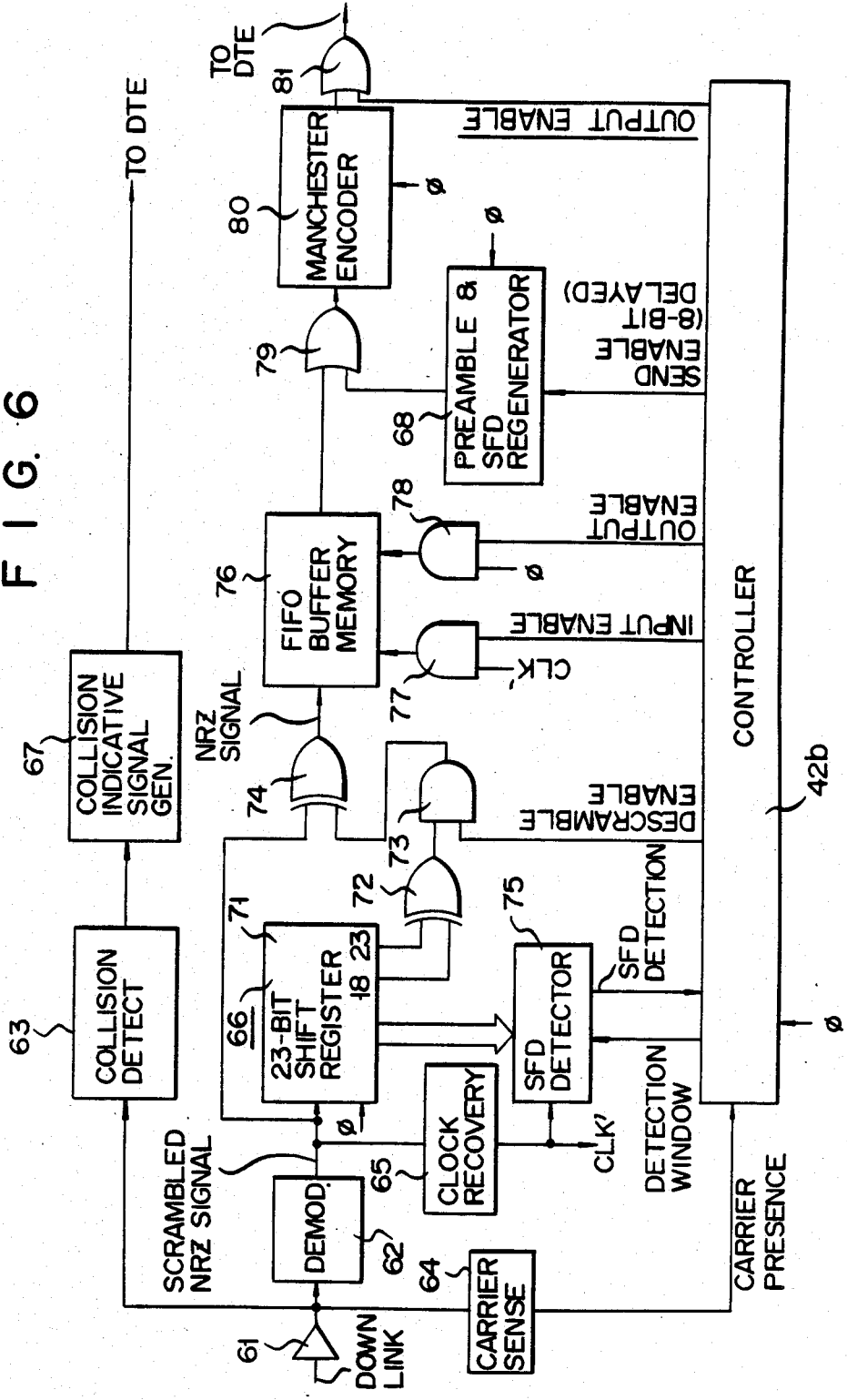
FIG. 6 is a block diagram of a reception section of MAU.
Figure 7:
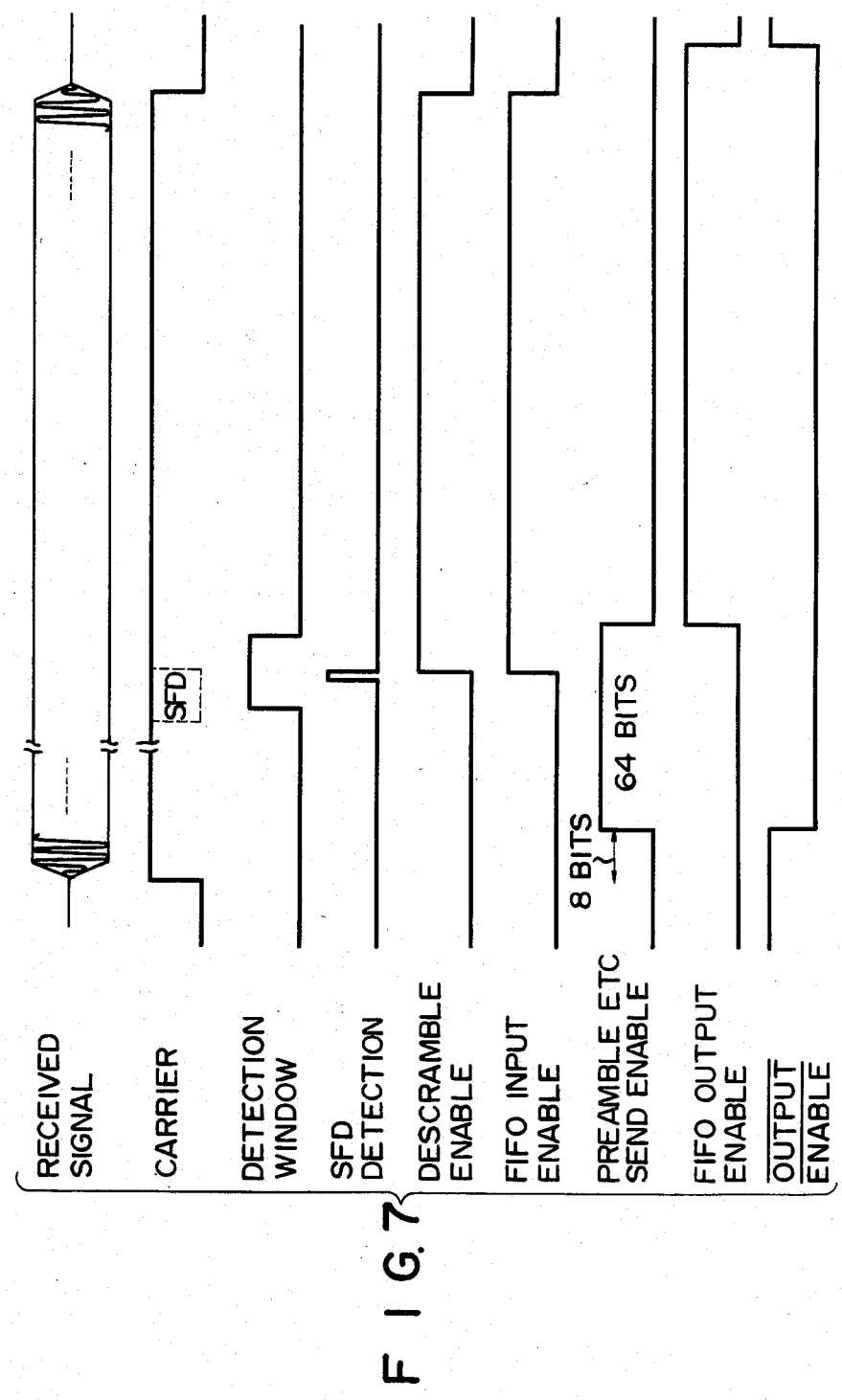
FIG. 7 is a time chart for describing the operation of the arrangement of FIG. 6.

A practical arrangement of the MAU will be described. The MAU has a transmission section and a reception section. The transmission section transmits data supplied from DTE 21 through an AUI (Attachment Unit Interface) cable to transmission line 11, and the reception section supplies data transmitted over transmission line 11 to the DTE through the AUI cable. FIGS. 4 and 6 show arrangements of the transmission and reception sections, respectively, and FIGS. 5 and 7 show time charts for describing the operations of the transmission and reception sections, respectively.

An information signal is supplied from the DTE to the MAU in the Manchester coded form. In FIG. 4, the Manchester coded signal from DTE 21 is supplied to a Manchester decoder & clock recovery circuit 41 to be decoded to a NRZ coded signal. Circuit 41 recovers a clock signal CLK from the Manchester coded signal, carrying the clock component, from DTE 21. The circuit 41 always monitors the level of the input signal line from the DTE to output a DATA PRESENCE signal upon detection of the data signal. The DATA PRESENCE signal is input to a controller 42a to set an operation starting timing. A crystal controlled pulse generator 43 is provided for generating accurate clock pulses $\phi$ (10 MHz) according to an IEEE 802.3 standard. The clock pulses are applied to controller 42a and other circuits. The NRZ signal from decoder 41 is applied to a SFD detector 44 and a FIFO (fast-in fast-out) buffer memory 45. SFD detector 44 detects the 8-bit SFD following the 56-bit preamble to generate a SFD detection signal. Detector 44 compares a specific pattern representing the SFD with the pattern of the input signal to output a detection signal when a coincidence occurs. The detection signal is applied to controller 42a.

The controller 42a outputs a FIFO INPUT ENABLE signal in response to the SFD detection signal. This signal enables an AND gate 46 to supply the recovered clock CLK to memory 45. Memory 45 reads in a data signal following the SFD from decoder 41 bit by bit in response to the clock signal CLK. Controller 42a forms a FIFO OUTPUT ENABLE signal at a predetermined timing to enable an AND gate 47 to supply the clock signal $\phi$ from clock generator 43 to memory 45. Memory 45 reads out data in response to the clock signal $\phi$.

Figure 8:
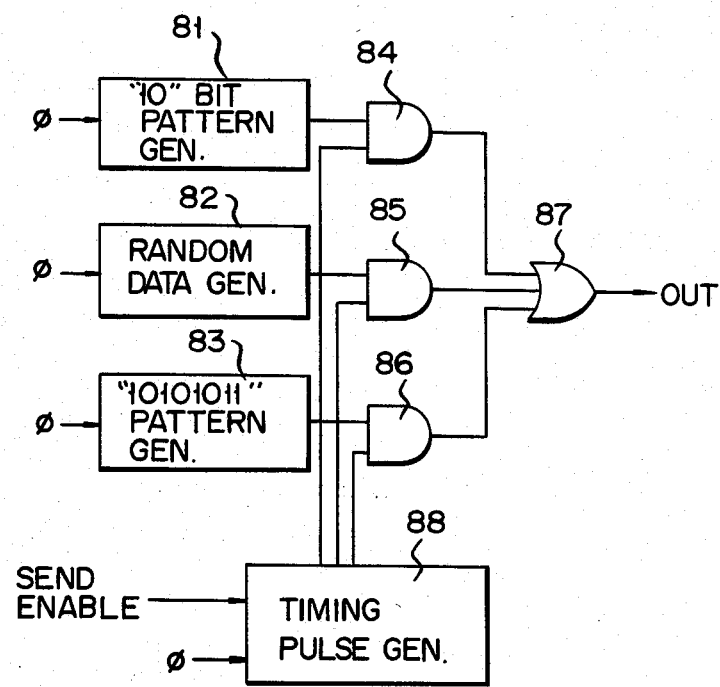
FIG. 8 shows an arrangement of a generator circuit in the transmission section of FIG. 4 for generating a preamble, etc.
Figure 9:
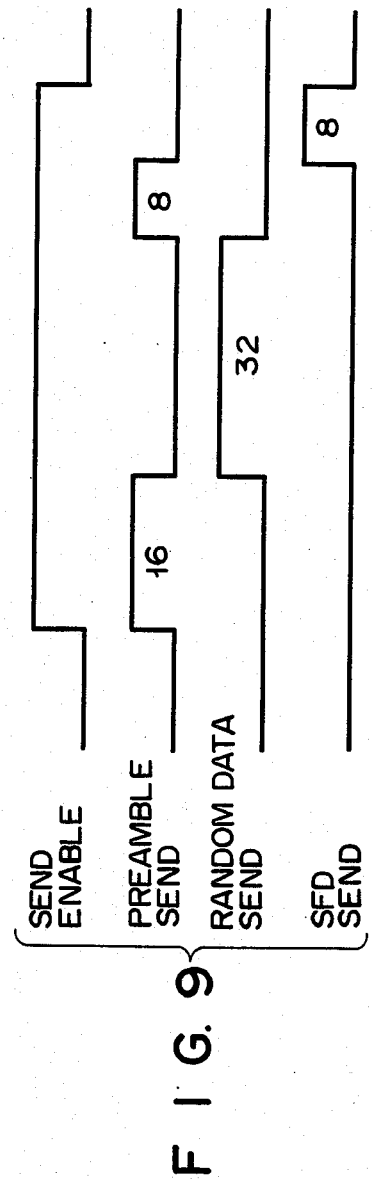
FIG. 9 is a time chart for describing the operation of the arrangement of FIG. 4.

The controller 42a generates a PREAMBLE ETC SEND ENABLE signal during 64-bit time after 8-bit time (1-bit time is a period of the clock signal for defining the operation of this system) from a point of time when the DATA PRESENCE signal is applied thereto, and applies it to a generator 48. The generator 48 comprises, as shown in FIG. 8, a circuit 81 for storing "10" preamble bit pattern, a circuit 82 for generating 32-bit random data, and a circuit 83 for storing the SFD bit pattern of "10101011". The outputs of these circuits are respectively coupled to AND gates 84, 85, 86. The outputs of these AND gates are coupled to an OR gate 87. These AND gates are enabled by PREAMBLE SEND, RANDOM DATA SEND and SFD SEND timing signals, shown in FIG. 9, from a timing pulse generator 88 responsive to the SEND ENABLE signal and the clock signal $\phi$. Therefore, it is understood that the 16-bit preamble, 32-bit random data, 8-bit preamble and 8-bit SFD are sequentially output from OR gate 87. The above-mentioned 8-bit time is set to absorb the increase or decrease in a data packet length caused by an error between the clock signals of received data and transmitted data.

Figure 10:
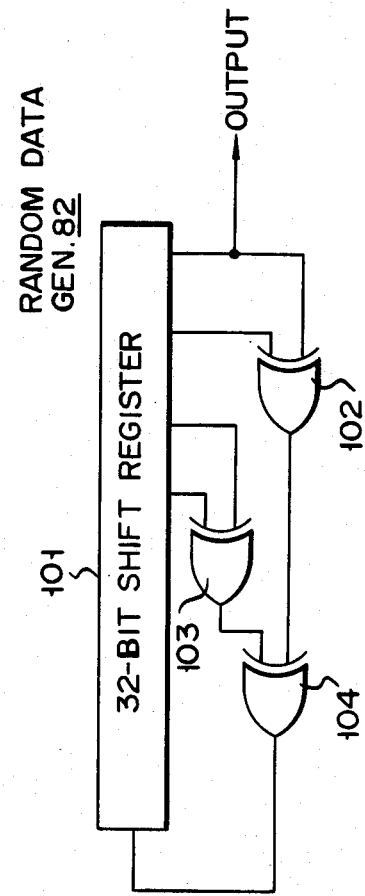
FIG. 10 shows an arrangement of a random data generator of FIG. 8.

Various configurations of random data generator are known, and can be used for generating 32-bit random data. For example, as shown in FIG. 10, the generator is constructed of a 32-bit shift register 101 and EXCLUSIVE OR gates 102, 103, 104 which receive suitable bit outputs of register 101.

The output of generator 48 is ORed in OR gate 49 with the output of memory 45. At this time point an output signal is not output from memory 48. In other words, the FIFO OUTPUT ENABLE signal is low. Therefore, the output signal of generator 48 is supplied through OR gate 49 to a scrambler circuit 50 composed of EXCLUSIVE OR gates 51, 53, a 23-bit shift register 52 and an AND gate 54.

More specifically, the output of the OR gate 49 is coupled through EXCLUSIVE OR gate 51 to the input of shift register 52. The eighteenth and twenty-third bit outputs of shift register 52 are coupled with the input of EXCLUSIVE OR gate 53. The output of EXCLUSIVE OR gate 53 is coupled through AND gate 54 to the input of EXCLUSIVE OR gate 51. AND gate 54 is enabled by a SCRAMBLE ENABLE signal from controller 42a. The output of EXCLUSIVE OR gate 51 is coupled through OR gate 55 to modulator 56. The SCRAMBLE ENABLE signal goes high together with the FIFO OUTPUT ENABLE signal when the SEND ENABLE signal supplied to generator 48 goes low. The data scramble is started with the data held in shift register 52 at this time as an initial value.

OUTPUT ENABLE signal which is always high is supplied to OR gate 55. When an OUTPUT ENABLE signal goes low at the same time the PREAMBLE ETC SEND ENABLE signal goes high, a NRZ signal appears at the output of OR gate 55, to be modulated by modulator 56 in a predetermined form for transmission. A modulated output signal is supplied through an electronic switch 57 enabled by the OUTPUT ENABLE signal from controller 42a to amplifier 58, which amplifies the input signal up to a level necessary for transmission.

The operation of the above-described transmission section will be described with reference to the time chart of FIG. 5. As shown in FIG. 5, when receiving the input signal from DTE 21, the DATA PRESENCE signal from circuit 41 goes high. Then, controller 25a sets the PREAMBLE ETC SEND ENABLE signal high after 8-bit time and allows generator 48 to sequentially output the 16-bit preamble, 32-bit random data, 8-bit preamble and 8-bit SFD. The PREAMBLE ETC SEND ENABLE signal remains high during the 64-bit time.

The output signal of generator 48 is input through OR gate 49 and EXCLUSIVE OR gate 51 to shift register 52 and OR gate 55. OUTPUT ENABLE signal becomes low simultaneously when the PREAMBLE ETC SEND ENABLE signal goes high, enabling OR gate 55 to transmit the output signal of generator 48 to modulator 56. The OUTPUT ENABLE signal goes high simultaneously when OUTPUT ENABLE signal goes low so that electronic switch 57 is enabled with the result that the modulated signal is transmitted through amplifier 58 to the up link. The output signal of generator 48 is loaded bit by bit into 23-bit shift register 52 by the clock signal $\phi$. The bits exceeding the capacity of register 52 are sequentially erased.

When the SFD component is detected from the NRZ signal from circuit 41 by detector 44 while generator 48 generates the output signal, the SEF detection signal is produced. Controller 42a allows the FIFO INPUT ENABLE signal to go high in response to the SFD detection signal. Consequently, data component following the SFD component is input to memory 45 bit by bit. When the SEND ENABLE signal becomes low at a predetermined time, the FIFO OUTPUT ENABLE signal and the SCRAMBLE ENABLE signal go high. As a result, the data readout from memory 45 is started, and scrambler circuit 50 is enabled. The content of shift register 52 is the last 7 bits of the random data, 8 bits of the preamble, and 8 bits of the SFD at the starting point of scrambling. The content of the shift register is used as an initial value (seed) of scrambling. The data read out from memory 45 is scrambled by scrambler circuit 50, and supplied through OR circuit 55 to modulator 56.

Next, the detection of the end-of-frame will be described. In the embodiment, the data following the SFD is composed of 8-bit units. That the length of data to be transmitted is 8×m bits is detected by measuring the number (m) of the 8-bit units i.e., the number (m) of octets in controller 42a within a period of time that the DATA PRESENCE signal remains high. Therefore, when 8 xm clock signals $\phi$ are measured since the FIFO OUTPUT ENABLE signal has gone high, the transmission of a data frame is regarded to be finished, so that the FIFO OUTPUT ENABLE signal is set low, and the OUTPUT ENABLE signal is set high.

The detection of the end-of-frame in the data packet is performed by detecting the end of the Manchester coded pocket transmitted through the AUI cable remaining high during 2-bit time or longer. Accordingly, the timing when the DATA PRESENCE signal from circuit 41 goes low is delayed by 2 to 3-bit time from the final bit of the pocket. However, this delay can be absorbed by delaying the transmission of the preamble from generator 48 with respect to the DATA PRESENCE signal. Even if the number of bits of the preamble from the DTE is different from 56 bits due to a certain reason the preamble of correct number of bits can be transmitted from the MAU due to the delayed transmission of data from generator 48. For example, even if the MAU receives the preamble which is longer up to 7 bits as compared with 56 bits, data can be output from memory 45 subsequent to the transmission of the 64-bit signal of the preamble etc. from generator 48 if the SFD is detected until 56+7-bit time after the supply of the preamble. Even if the number of bits of the received preamble is less than 56, the MAU can transmit data subsequent to the 64-bit signal of the preamble etc. due to the presence of memory 45.

The signal transmitted to transmission line 11 by the transmission section described above is composed, as shown in FIG. 3, of the 16-bit preamble, 32-bit random data, 8-bit preamble, 8-bit SFD and scrambled data. The (16+8)-bit preamble of these signals is common to the MAUs. However, the random data have a very high probability in which they are different from MAU to MAU, and, even in a MAU, become different for every transmission of data. Thus, when the signals collide on the transmission line, a difference of bits occurs between the random data. Therefore, the collision can be detected.

The difference of bits in the preambles due to random data will be quantitatively described. When n-bit random data is contained in the 56-bit preamble, the probability that the random data of the collided signals completely coincide is $(0.5)^n$. This can be regarded as being the probability of failing the detection of the collision. If the probability of failing the detection of collision is below a bit error rate irrespective of the presence of collision, no problem will occur even if the detection of collision is regarded as have been completely performed. There is no reason why the probability must be set much lower than the bit error rate.

The bit error rate to be required is $10^{-9}$ or less at the link level. Therefore, the probability of failing the detection of collision may be $10^{-9}$ or less. The number n of bits of random data may be determined to satisfy the following relation:

$$(0.5)^n \leq 10^{-9}$$

In this embodiment, $n \geq 30$.

As apparent from the foregoing description, when the bit error rate is $10^{-9}$ or less, by disposing the random data of $n(\geq 30)$ bits in the preamble it is possible to reliably detect the collision while receiving the preamble. Therefore, an effective network having a long transmission line can be formed.

The reception section will be described with reference to FIG. 6. A transmission signal from the down link is amplified by a reception amplifier 61 up to a level suitable for reception processing, and applied to a demodulator 62, a collision detector 63 and a carrier sense circuit 64. The scrambled NRZ signal obtained from demodulator 62 is supplied to a clock recovery circuit 65 and a descrambler circuit 66. A clock recovery circuit 65 reproduces a clock signal CLK' from the NRZ signal.

Carrier sense circuit 65 receives the output signal of amplifier 61, detects a carrier signal to generate a CARRIER PRESENCE signal which is applied to a controller 42b. The collision detector 63 receives the output signal of amplifier 61 to detect the presence of collision on the basis of the presence of beat signal having a time-varying envelope. When the collision occurs, a collision detection signal is transmitted to a collision indicating signal generator 67, which informs DTE of the occurrence of the collision. The DTE inhibits to transmit data in response to the collision indicating signal.

The CARRIER PRESENCE signal is applied from carrier sense circuit 64 to controller 42b substantially simultaneously with the reception of the input signal, and the controller transmits the PREAMBLE ETC SEND ENABLE signal delayed by 8-bit time to a PREAMBLE & SFD generator 68. The generator 68 can be constructed in the same manner as generator 48 of the transmission section to sequentially output the preamble and the SFD stored in advance. Being supplied to DTE the preamble does not contain random data.

The descrambler circuit 66 has, similar to the scrambler circuit of the transmission section, a 23-bit shift register 71, EXCLUSIVE OR gates 72, 74 and an AND gate 73. The output of demodulator 62 is coupled to a shift register 71 and an EXCLUSIVE OR gate 74. The eighteenth and twenty-third bit outputs of shift register 71 are coupled with EXCLUSIVE OR gate 72, whose output is coupled to EXCLUSIVE OR gate 74 through an AND gate 73. The AND gate 73 is enabled by a DESCRAMBLE ENABLE signal from controller 42b.

The 8 bit outputs of shift register 71 on the input side thereof are coupled with a SFD detector 75, which detects the SFD bit pattern from the input signal of shift register 71 in response to a SFD detection command (DETECTION WINDOW) signal supplied from controller 42b after 50-bit time from the application of the CARRIER PRESENCE signal. The detector 75 applies a SFD detection signal to controller 42b. The controller 42b generates the DESCRAMBLE ENABLE signal to enable AND gate 73 in response to the application of the SFD detection signal, resulting in starting a descrambling operation. When the SFD signal is detected, the seed (an initial value of the descrambling operation) having 7-bit random data, 8-bit preamble and 8-bit SFD has been loaded in 23-bit shift register 71. After the SFD is detected, the scrambled data is input to shift register 71 to descramble the data. The initial value (seed) of the descrambling operation is the same as the initial value (seed) of the scrambling operation in the transmission section.

The descrambled NRZ-coded signal is applied from EXCLUSIVE OR gate 74 to a FIFO buffer memory 76. The controller 42b forms a FIFO INPUT ENABLE signal simultaneously when the DESCRAMBLE ENABLE signal goes high, to enable AND gate 77, with the result that the recovered clock signal CLK' is applied to memory 76. The memory 76 reads in the NRZ signal in response to the clock signal CLK'.

When 64-bit time is elapsed after the PREAMBLE ETC SEND ENABLE signal has gone high, i.e., when generator 68 finishes to output the SFD, the PREAMBLE SEND ENABLE signal goes low, and the FIFO OUTPUT ENABLE signal goes high. Consequently, an AND gate 78 is enabled to apply the clock signal $\phi$ to memory 76. Thus, the NRZ signal is sequentially read out from memory 76. The outputs of memory 76 and generator 68 are coupled through an OR gate 79 to a Manchester encoder 80. The encoder 80 encodes the NRZ signals from memory 76 and generator 68 to the Manchester coded signals, which are transmitted to DTE through an OR gate 81 by the $\overline{\text{OUTPUT ENABLE}}$ signal. The $\overline{\text{OUTPUT ENABLE}}$ signal is always high and goes low simultaneously when the PREAMBLE ETC SEND ENABLE signal goes high.

The operation of the reception section will be described with reference to the timing chart of FIG. 7. The operation of the reception section is substantially the same as that of the transmission section. When an input signal is received from the down link, the CARRIER PRESENCE signal is applied from carrier sense circuit 64 to controller 42b. The controller 42b generates the PREAMBLE ETC SEND ENABLE signal with a length of 64-bit time after delay of 8-bit time. This signal allows generator 68 to transmit the 56-bit preamble and the 8-bit SFD to encoder 80. The $\overline{\text{OUTPUT-ENABLE}}$ signal goes low simultaneously when the PREAMBLE ETC SEND ENABLE signal becomes high, enabling OR gate 81 to transmit the Manchester coded signal to the DTE. The controller 42b generates the SFD DETECTION WINDOW signal having a duration slightly longer than the time length of the SFD near at the timing the SFD of the input signal incomes, in response to the CARRIER PRESENCE signal, to instruct SFD detector 75 to detect the SFD. When the SFD is detected, detector 75 issues the SFD detection signal to controller 42b. The controller generates the DESCRAMBLE ENABLE signal and the FIFO INPUT ENABLE signal in response to the SFD detection signal. As a result, the scrambled data is descrambled. The descrambled NRZ data is read bit by bit in memory 76. When the 64-bit preamble and the SFD are output from generator 68, controller 42b generates the FIFO OUTPUT ENABLE signal to enable AND gate 78. Consequently, the NRZ signal is read out from memory 76 bit by bit, and then Manchester-coded to be transmitted to the DTE. The end-of-frame is detected in the same manner as in the transmission section. When the end-of-frame is detected, the DESCRAMBLE ENABLE signal and the FIFO INPUT ENABLE signal go low. The FIFO OUTPUT ENABLE signal is maintained high during the 8×m bit time. The OUTPUT ENABLE signal goes high simultaneously when the FIFO OUTPUT ENABLE signal goes low, disabling OR gate 81.

The present invention is not limited to the particular embodiments described above. The collision detection method is not limited to the beat signal level detection method, but the bit comparison method may be used instead. In case of the bit comparison method, the collision detector may be provided on the output side of demodulator 62. Various configurations can be utilized for generating random data. Communication medium may have one transmission line. In case of one transmission line, a frequency-division multiplex transmission system is utilized, and the head end has a frequency converter. The hardware construction may be freely modified.

In the embodiment of this invention described above, part of the preamble is replaced with the random data. However, the random data may be arranged ahead of the preamble as shown in FIG. 11. Further, the random data may be inserted between DA and SA included in the singificant data section as shown in FIG. 12. The bit length of the random data is not limitative. The length of a data packet transmitted from the MAU may be different from that of data packet provided by the DTE due to the random data.

What is claimed is:

1. An information transmission system comprising:
   a communication medium;
   a plurality of information processors each coupled to an arbitrary point on said medium, said processor being arranged to transmit and receive an information signal in a data format having a preamble section with a predetermined bit pattern and a data section following said preamble section; and
   said information processors each including means for detecting the collision of transmission signals among said processors on said communication medium to inhibit the transmission of the information signal when the collision is detected; and
   means for replacing part of said preamble section with random data prior to the transmission of the information signal.

2. An information transmission system according to claim 1, wherein said information processors each comprise a data terminal equipment and a medium attachment unit coupled with said data terminal equipment,
   said data terminal equipment being arranged to transmit the information signal in the format having the preamble section and the data section following said preamble section, and
   said medium attachment unit comprises means for replacing part of said preamble section with the random data prior to the transmission of the information signal to said communication medium.

3. An information transmission system according to claim 2, wherein said random data replacing means comprises random data generating means for generating random data at random for every transmission of the information signal.

4. An information transmission system according to claim 2, wherein said part of said preamble section replaced with said random data is disposed in an intermediate portion of said preamble section.

5. An information transmission system according to claim 1, wherein said information processors comprise means for modulating the information signal to be transmitted over said communication medium, and
   said collision detecting means is arranged to detect the collision of information signals transmitted from a plurality of information processors to said communication medium on the basis of a beat signal resulting from the collision of the information signals.

6. An information transmission system according to claim 1, wherein said collision detecting means of said information processor is arranged to detect the collision of the information signals in response to a difference in bits of random data in information signals from a plurality of information processors, and
   the number of the bits of the random data is set such that the probability of failing the detection of the collision, depending upon the number of the bits of the random data, is equal to or less than a bit error rate on said communication medium.

7. An information transmission system comprising:
   a communication medium;
   a plurality of data terminal equipments each arranged to transmit and receive an information signal in a format having a preamble section having a predetermined bit pattern, and a data section following said preamble portion;
   a plurality of medium attachment units for respectively coupling said DTEs to arbitrary points on said communication medium to effect information communications among said DTEs;
   said MAUs each comprising:
   collision detecting means coupled with said communication medium for detecting a collision of information signals transmitted from said DTEs and informing a corresponding DTE of the occurrence of the collision to inhibit the transmission of an information signal when the collision is detected;
   first receiving means connected to receive the information signal from the corresponding DTE for producing a DATA PRESENCE signal;
   first preamble generating means responsive to the DATA PRESENCE signal for generating the preamble section of the predetermined bit pattern, part of which is replaced with random data;
   first transmitting means for sequentially transmitting to said communication medium the preamble section from said first preamble generating means, and the data section from the DTE received by said first receiving means;
   second receiving means connected to receive the information signal having the preamble section part of which is replaced with random data and the data section from said communication medium for producing a detection signal;
   second preamble generating means responsive to the detection signal from said second receiving section for generating a preamble section having the predetermined bit train; and
   second transmitting means coupled to said second preamble generating means and said second receiving means for sequentially transmitting the preamble section from said second preamble generating means and the data section from said second receiving means.

8. An information transmission system according to claim 7, wherein said first transmitting means comprises scrambling means for scrambling the data section after the preamble section has been transmitted,
   said scrambling means being arranged to initiate the scrambling of data with at least part of the random data of the preamble section as an initial value.

9. An information transmission system according to claim 7, wherein said DTEs are each arranged to transmit a Manchester-coded information signal to a corresponding one of said MAUs; and
   said first receiving means comprises decoding means for decoding the Manchester-coded information signal to a non-return-to-zero coded information signal.

10. An information transmission system according to claim 7, wherein said first transmitting means comprises modulating means for modulating the information signal.

11. An information transmission system according to claim 7, wherein said first preamble generating means is arranged to generate the preamble section after a plurality of bit times from the generation of the DATA PRESENCE signal.

12. An information transmission system according to claim 7, wherein said second receiving means comprises descrambling means for descrambling the data section received by said second receiving means after the preamble generated by said second preamble generating means has been transmitted to said DTE.

13. An information transmission system according to claim 7, wherein said second preamble generating means is arranged to generate the preamble after a plurality of bit times from the generation of the information detection signal by said second receiving means.

14. An information transmission system comprising:
a communication medium;
a plurality of information processors each coupled to an arbitrary point on said medium, said processor being arranged to transmit and receive an information signal in a data format having a preamble section with a predetermined bit pattern and a data section following said preamble section and having first and second address parts; and
said information processors each including means for detecting the collision of transmission signals among said processors on said communication medium to inhibit the transmission of the information signal when the collision is detected; and
means for inserting random data in the information signal prior to the transmission of the second address part in the information signal.

* * * * *